April 1, 1952   A. S. VOLPIN ET AL   2,591,031
LUBRICATED PLUG VALVE
Filed June 19, 1945   4 Sheets-Sheet 1

INVENTOR.
A. S. VOLPIN
J. P. SMITH.
BY Lester B. Clark
+ Ray L. Smith
ATTORNEYS

April 1, 1952 A. S. VOLPIN ET AL 2,591,031
LUBRICATED PLUG VALVE
Filed June 19, 1945 4 Sheets-Sheet 2

INVENTOR.
A.S. VOLPIN.
J. P. SMITH.
BY Lester B. Clark
+ Ray L. Smith.
ATTORNEYS April 1, 1952     A. S. VOLPIN ET AL     2,591,031
LUBRICATED PLUG VALVE Filed June 19, 1945     4 Sheets-Sheet 3

INVENTOR.
A. S. VOLPIN
BY J. P. SMITH
Lester B. Clark
& Ray L. Smith
ATTORNEYS

April 1, 1952 — A. S. VOLPIN ET AL — 2,591,031
LUBRICATED PLUG VALVE
Filed June 19, 1945 — 4 Sheets-Sheet 4

INVENTOR.
A. S. VOLPIN
J. P. SMITH.
BY Lester B. Clark
Ray L. Smith
ATTORNEYS

Patented Apr. 1, 1952

2,591,031

UNITED STATES PATENT OFFICE 2,591,031

LUBRICATED PLUG VALVE

Alexander S. Volpin and Jopling P. Smith,
Houston, Tex.

Application June 19, 1945, Serial No. 600,322

10 Claims. (Cl. 251—93)

The invention relates to a lubricated valve where the sealing material will be forced by line pressure to provide a seal.

It is one of the objects of the invention to provide a control for the movement of the sealing material in a lubricated valve so that the material will not be unnecessarily dissipated.

Another object of the invention is to provide a control plunger for the sealing material in lubricated valves so as to bar the escape of such material from the storage reservoir to the high pressure side of the valve as the material is introduced into the reservoir.

Still another object of the invention is to provide a passage for the introduction of sealing material through the distribution system and into a reservoir in such a manner that when the reservoir is filled, there can be no wastage of lubricating or sealing material to the upstream side.

Still another object of the invention is to provide a two-way valve wherein the lubricant introduced at one side of the valve is barred from discharging to the other side.

Other and further objects of the invention will be readily apparent when the following description is considered in connection with the accompanying drawings, wherein.

Figure 2:
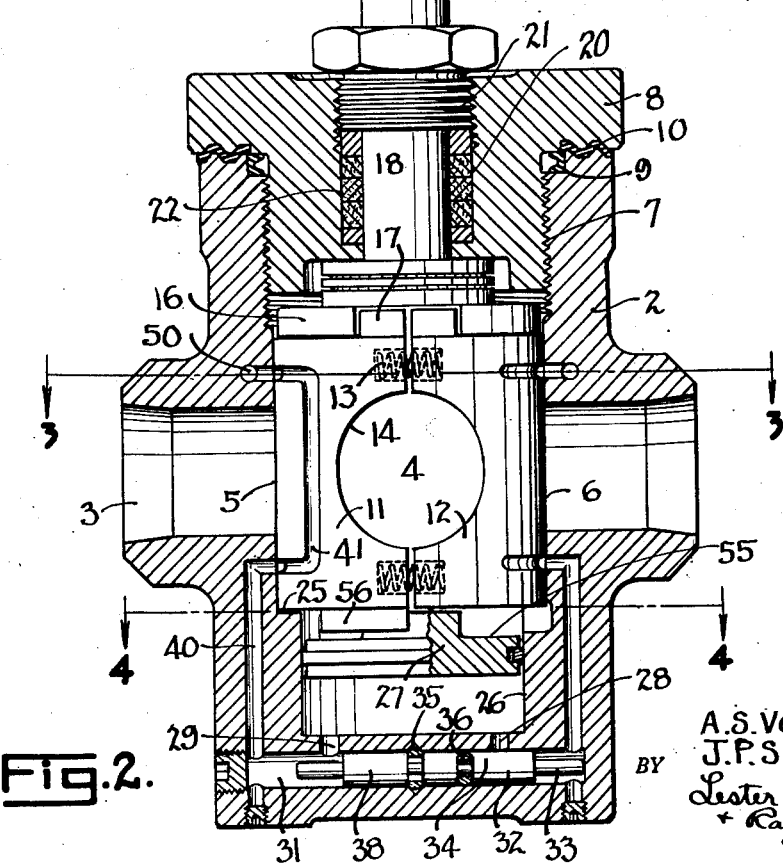
Fig. 2 is a section taken on the line 2—2 of Fig. 1 and illustrating the internal construction of the parts.
Figure 3:
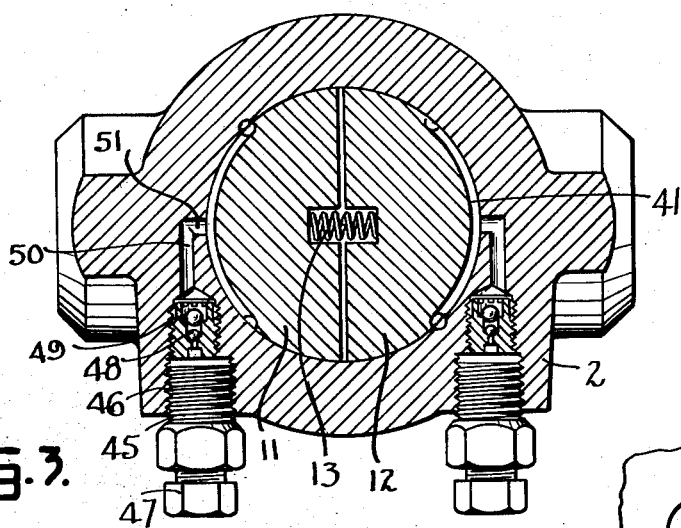
Figure 4:
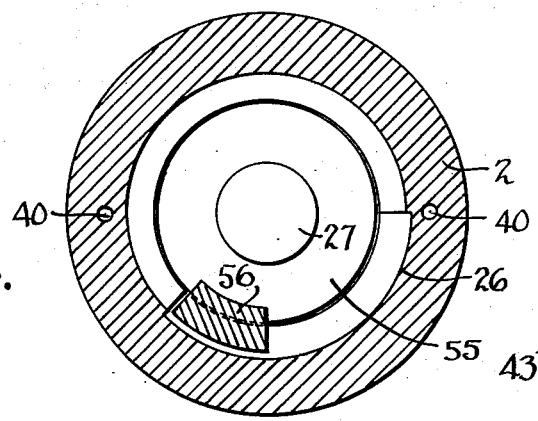

Figs. 3 and 4 are sections taken on the lines 3—3 and 4—4 respectively of Fig. 2.

Figure 5:
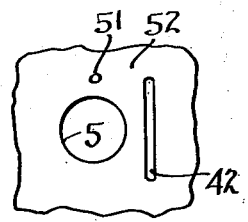

Fig. 5 is a broken detail view illustrating a flow port and one of the grooves adjacent thereto.

Figure 6:
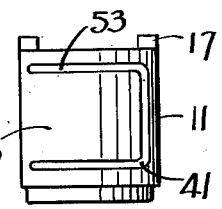

Fig. 6 shows a side elevation of the closure plug with the distribution groove thereon, which is adapted to connect with the vertical groove of Fig. 5.

Figure 7:
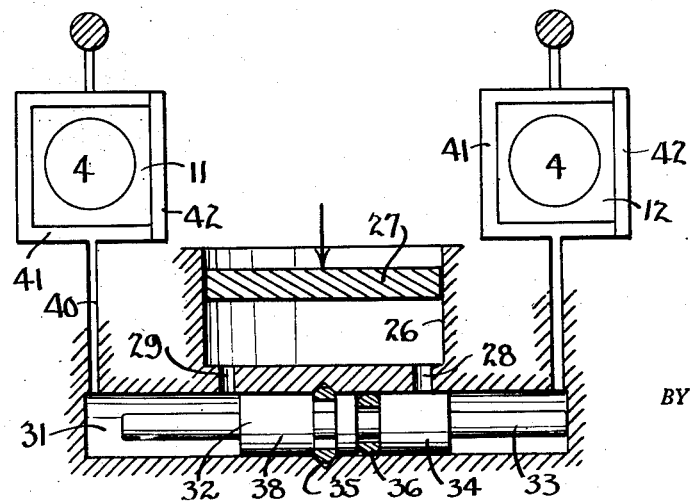

Fig. 7 is a schematic arrangement of the lubrication system.

Figure 8:
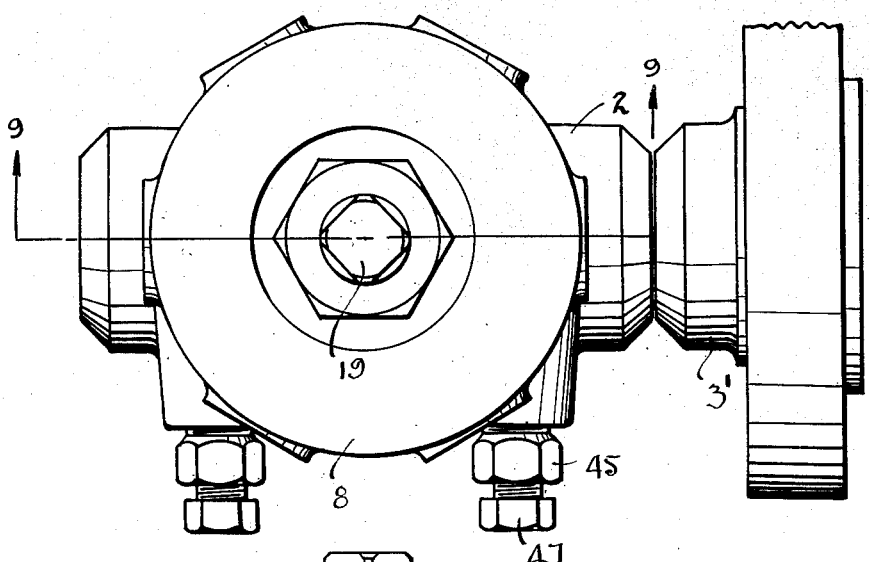

Fig. 8 is a top plan view looking down on a modified form of the valve.

Figure 9:
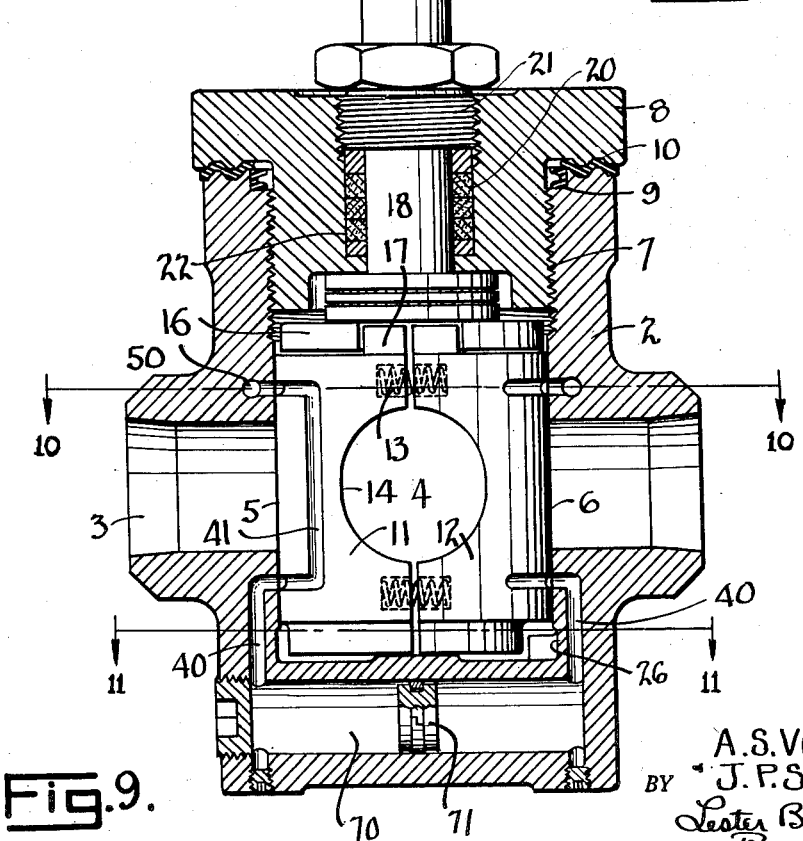

Fig. 9 is a vertical section taken on the line 9—9 of Fig. 8 and illustrating the internal construction of the valve.

Figure 10:
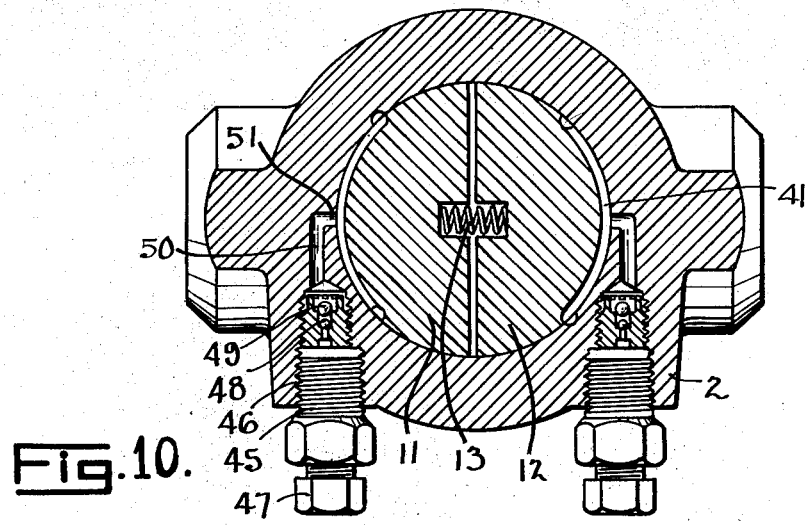
Figure 11:
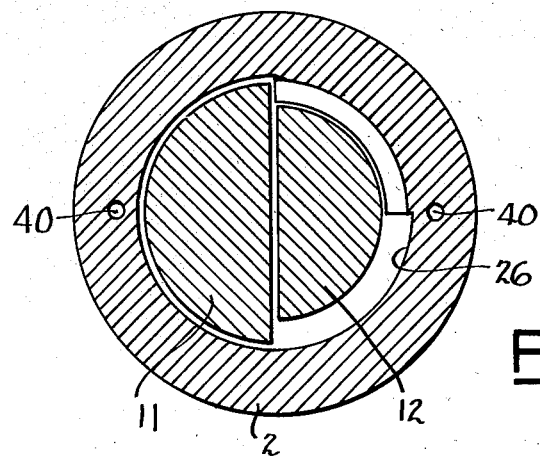

Figs. 10 and 11 are sections taken on the lines 10—10 and 11—11 respectively of Fig. 9.

Figure 12:
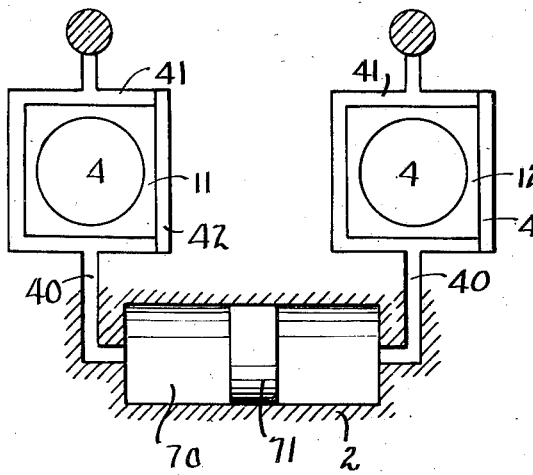

Fig. 12 is a schematic arrangement of the sealing material distribution system.

Figure 1:
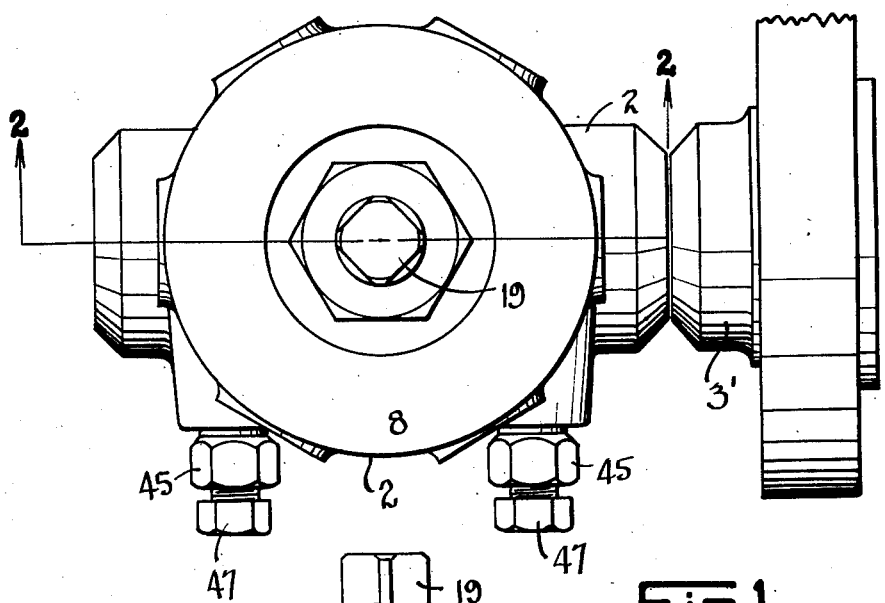
Fig. 1 is a top plan view looking down on the valve.

In Fig. 1 the valve housing 2 is arranged to be connected to another valve, pipe, or other structure 3' in any desired manner. The housing 2 has a flow passage 3 therein which is intersected by the plug chamber 4 so as to provide the flow ports 5 and 6 in the plug chamber.

The upper portion of the plug chamber 4 is threaded at 7 to receive the cap or bonnet 8 which may be sealed to the body with a lip type packing 9 and the irregular gasket 10 so as to insure a seal with the body.

Rotatably arranged in the plug chamber 4 are the plug segments 11 and 12 which together make up the circular plug as best seen in Fig. 3. These two segments are normally forced apart by the springs 13 and each has a semi-circular recess 14 therein so that the flow passage through the plug is thus formed. These segments are arranged for turning by a head 16 which is arranged to abut against the upstanding lugs 17 to turn the plug segment while the stem 18 connected to such head has a non-circular portion 19 thereon extending above the cap 8 to receive a wheel or other member for turning the plug. The packing 20 and the retainer collar 21 are disposed in a large recess 22 in the cap so as to provide a seal about the stem.

The plug chamber 4 is reduced in size to provide a shoulder 25 which defines a reservoir 26 in which the movable barrier 27 is sealed but adapted for movement.

This barrier is arranged to be moved upwardly as seen in Fig. 2 by the introduction of sealing material and then the line pressure in the plug chamber 4 will force the barrier downwardly to compel the discharge of lubricant to the distribution system. The discharge from the reservoir 26 may occur through the opening 28 so as to form a seal about the flow port 6 while the discharge from the opening 29 tends to carry sealing material to the port 5.

It is to be understood that this valve may be a two-way valve in that any side may be the high pressure side or either side may be the low pressure side.

The lubricant introduced must not be wasted and should be prevented or barred from discharging on through the distribution system into the high pressure side at the time the sealing material is introduced. To thus control introduction of the sealing material and prevent its loss, an enlarged passage 31 extends across the base of the housing 2 underneath the reservoir 26 and the openings 28 and 29 lead thereinto.

Slidably disposed in this passage 31 is a valve 32 which has the extensions 33 to abut the end of the passage 31 to position the closure portions 34 of the valve over the openings 28 or 29.

In order that the valve may be releasably latched to close either the passage 28 or the passage 29 as the case may be, a groove 35 in the passage is arranged to receive a snap ring 36. Two of these snap rings are shown so that the valve may be spaced in the right hand position to bar any sealing material moving to the port 6 or the valve may be moved to the left to close the opening 29 and bar any sealing material to the port 5.

The left hand end of the passage 31 has a conduit 40 connected thereto which extends through the body and is arranged to connect with the discharge groove 41 in the segment 11. This groove is preferably the shape shown in Fig. 6 and extends three-fourths of the way around the port 5. In order to give full port lubrication or sealing, a vertical groove 42 is arranged in the surface of the plug chamber 4 as best seen in Fig. 5. Thus when the plug is in closed position, the surface 43 of the plug will overlie the port 5 and the grooves 41 and 42 will completely enclose the port.

Fig. 3 shows the injectors 45 which are in the form of fittings threaded at 46 into the body and having the threaded pressure spindle 47 therein. The material injected into the valve will pass the first check valve 48, the second check valve 49 and move on into the connection 50 which is arranged to discharge at 51 into the face 52 of the plug chamber. This discharge 51 will be at the elevation of one of the horizontal legs 53 of the groove 41 so that the groove may be filled with sealing material.

As a matter of fact, it is intended that the injection will be sufficient to force the sealing material through the distribution groove 41, the conduit 40, and on into the passage 31. If the valve 32 is in the end of the housing toward the port where the injection is being made, of course the valve will be forced in the opposite direction so as to block off the opposite outlet such as 28 if the injection is being made adjacent port 5.

The sealing material will then move into the reservoir 26 and cause the barrier to move upwardly until the reservoir is filled whereupon no more sealing material can be introduced.

Presuming that the port 5 will be the downstream port and that the high pressure is at the port 6, then the parts will be in the position shown in Fig. 2. The high pressure leaking into the chamber 4 will exert pressure on the upper surface 55 of the barrier 27 and cause it to gradually move down as the sealing material becomes dissipated from the distribution grooves 41 due to the use of the valve. When the valve is in open position, the horizontal leg of the groove 53 is disconnected from the inlet 51.

In event the pressure on the valve or the position of the valve in the line is reversed and the port 6 should become the low pressure side, then of course the valve 32 will move to cover the outlet 29 when sealing material is introduced into the right hand side of the valve and the procedure just described will be reversed.

The lug 56 on the bottom of the segments tends to limit the turning movement of the segments of the housing.

Generally the construction provides for automatic line pressure lubricating and sealing of a plug valve without wastage of the sealing material.

The construction of Figs. 9 to 12 inclusive is quite similar to that in Figs. 1 to 7 inclusive except that the reservoir 26 has been removed from the plug chamber and the passage 31 has been substantially enlarged so as to provide a reservoir 70 having the barrier 71 move therein in response to a predominate pressure on one side or the other. Thus either side can be used for injection, depending upon the direction in which the pressure is applied to the valve. The barrier 71, however, being slidable in the reservoir 70, moves away from the port adjacent which the injection is being made, then during operation it moves toward that port or low pressure end of the reservoir due to line pressure feeding in through the distribution groove on the high pressure side. The barrier prevents any flowing by or leakage from the high pressure to the low pressure side and prevents loss or wastage of the sealing material by coming to a positive stop at the end of the reservoir 70 so as to warn the operator that the reservoir has been filled.

What is claimed is:

1. A lubricated plug valve including a housing adapted for positioning in a pressure line so as to receive the high pressure at either side thereof, a plug chamber in said housing, a lubricant reservoir comprising a reduced extension of said chamber, a barrrier in said reservoir adapted to be moved by the high pressure in the valve, a plug turnable in said chamber, flow ports in said housing to be closed by said plug, a lubricant seal groove encompassing each flow port when said plug is in closed position, a passage for lubricant extending in said housing from one flow port groove to the other flow port groove, spaced upstream and downstream openings in said passage leading to said reservoir, spaced lubricant injection inlets in said housing to inject sealing material into said passage, and a control member slidably disposed in said passage so that the injection of lubricant through the downstream inlet will move said member to open the downstream opening and to close the upstream opening of said reservoir whereby the entire volume of the reservoir is available to the downstream side.

2. A two-way lubricated plug valve including a housing and plug rotatable therein, opposed upstream and downstream flow ports covered by said plug in closed position, means to distribute lubricant sealing material about each flow port, a reservoir in said housing, an outlet to each of said means from said reservoir, an injection inlet to each of said means for the introduction of sealing material and a member movable in said reservoir by the pressure of sealing material injected in the downstream side of the valve barring such injected material in said reservoir against outlet to the high pressure side.

3. A two-way lubricated plug valve including a housing and plug rotatable therein, opposed flow ports covered by said plug in closed position, means to distribute lubricant sealing material about each flow port, a reservoir in said housing, an outlet to each of said means from said reservoir, an injection inlet to each of said means for the introduction of sealing material and a member movable in said reservoir by the pressure of sealing material injected in the downstream side of the reservoir barring said reservoir against the outlet of sealing material to the high pressure side, said member in said reservoir being movable to discharge sealing material therefrom to the downstream port in response to the high pressure on the valve.

4. A two-way lubricated plug valve including a housing and plug rotatable therein, opposed flow ports covered by said plug in closed position, means to distribute lubricant sealing material about each flow port, a reservoir in said housing, an outlet to each of said means from said reservoir, an injection inlet to each of said means for the introduction of sealing material and a member movable in said reservoir by the pressure of sealing material injected in the downstream means of the valve, said member barring outlet of sealing material to the high pressure side.

5. In a high pressure lubricated plug valve adapted to have either side receive the high pressure, a lubricant seal system comprising a reservoir in the valve housing, a reservoir line pressure movable barrier therein, separate passages from said reservoir to conduct sealing material to seal each flow port of the valve, means to inject sealing material into either of said passages to move said barrier upon the introduction of material to the passage which is to remain open, said barrier barring the passage of material from either side to the other side thereof.

6. In a high pressure lubricated plug valve adapted to have either side receive the high pressure, a lubricant seal system comprising a reservoir in the valve housing, a line pressure movable barrier therein, separate passages from said reservoir to conduct sealing material to seal each flow port of the valve, means to inject sealing material into either of said passages to move said barrier upon the introduction of sealing material to the passage which is to remain open, said barrier barring the passage of material from either side to the other side thereof, said barrier consisting of a member slidable in response to the pressure on the sealing material being introduced.

7. In a high pressure lubricated plug valve having a flow port at each the high and low pressure sides and adapted to have either side receive the high pressure, a lubricant seal system comprising a reservoir in the valve housing, a line pressure movable barrier therein, separate passages from said reservoir to conduct sealing material to seal each flow port of the valve, means to inject sealing material into either of said passages to move said barrier upon the introduction of sealing material to the passage which is to remain open, said barrier barring the passage of material from either side to the other side thereof, a member slidable in response to the pressure on the sealing material being introduced for blocking one of said passages, and latch means to thereafter retain said member in such position.

8. A plug valve including a housing having opposed flow ports, a rotatable plug therein, a groove about each flow port, a passage in the housing connecting said grooves, independent means to inject sealing material into each of said grooves, an enlargement in said passage providing a reservoir, a barrier therein and movable in response to upstream line pressure whereby sealing material in said passage may be urged to said downstream groove by the high pressure leaking into said passage, said barrier barring the reservoir against discharge of material into said passage to the high pressure groove and being movable upon injection of sealing material through said means to said downstream groove.

9. A two-way lubricated plug valve comprising a housing, opposed flow ports therein, a plug rotatable in said housing, independent means to distribute sealing material about each flow port, a reservoir in said housing, a conduit connecting each of said means to said reservoir, an injection unit for each conduit, and additional means movable in said reservoir in response to the injection of sealing material through either of said units displacing material from the reservoir to the other of said conduits and first means.

10. A two-way lubricated plug valve including a housing and plug rotatable therein, opposed upstream and downstream flow ports covered by said plug in closed position, means to distribute lubricant sealing material about each flow port, a reservoir in said housing, an outlet to each of said means from said reservoir, an injection inlet to each of said means for the introduction of sealing material to such reservoir, and a member movable in one direction to cover said outlet to the upstream means by the sealing material injected in the downstream side of the valve and thereafter movable in the opposite direction in response to line pressure leaking into said upstream flow port whereby the injected sealing material may be automatically distributed about said downstream flow port to form a seal.

ALEXANDER S. VOLPIN.
JOPLING P. SMITH.

REFERENCES CITED

The following references are of record in the file of this patent:

UNITED STATES PATENTS

| Number | Name | Date |
| --- | --- | --- |
| 1,403,756 | Farmer | Jan. 17, 1922 |
| 2,006,715 | McCausland | July 2, 1935 |
| 2,107,182 | Henderson | Feb. 1, 1938 |
| 2,119,766 | Aderhold | June 7, 1938 |
| 2,269,887 | Sharp | Jan. 13, 1942 |